United States Patent

Sheppard et al.

[11] 3,890,294
[45] June 17, 1975

[54] AZO CONTAINING POLYBUTADIENES

[75] Inventors: Chester Stephen Sheppard, Tonawanda; Ronald Edward MacLeay, Williamsville, both of N.Y.

[73] Assignee: Pennwalt Corporation, Philadelphia, Pa.

[22] Filed: Aug. 8, 1973

[21] Appl. No.: 386,661

Related U.S. Application Data

[60] Division of Ser. No. 37,311, May 14, 1970, Pat. No. 3,752,802, which is a continuation-in-part of Ser. No. 667,352, Sept. 3, 1967, abandoned.

[52] U.S. Cl....... 260/94.7 N; 260/75 N; 260/78 SC; 260/152; 260/162; 260/192; 260/864; 260/874; 260/880
[51] Int. Cl.............................................. C08g 27/08
[58] Field of Search ............................... 260/94.7 N

[56] References Cited
UNITED STATES PATENTS
3,274,166  9/1966  Breslow et al. ..................... 260/85.1
3,758,426  5/1973  Boirin et al. .......................... 260/18

*Primary Examiner*—Melvin Goldstein
*Attorney, Agent, or Firm*—William D. Mitchell

[57] ABSTRACT

A. A novel class of azo compounds $$R-N=N-R_1$$

where R and/or $R_1$ are groups containing an acylating function, e.g., acyl chloride, chloroformate or anhydride. Example: Cis-4,4'-Azobis-(4-cyanovaleryl chloride).

B. A novel class of azo containing polymers $$(R'-N=N-C(R_2)(R_2') - R_2'' - Y)_m - D - Z,$$

where R' is t-aliphatic, formed by reacting a polymer having at least one group reactive with an acyl group and a compound as in "A" containing only one acylating function. Example: the reaction product of 4-t-butylazo-4-cyanovaleryl chloride and hydroxyl terminated polybutadiene liquid resin.

C. A novel class of azo containing polymers $$Z(E-Y-R_2''-C(R_2)(R_2')-N=N-C(R_2)(R_2')-R_2''-Y)_m-E-Z,$$

formed by the reaction of a compound as in "A" having two acylating functions with (1) a monomer having two acyl-reactive groups and a monomer having two acylating functions, or (2) a polymer having at least one acyl-reactive group.

D. Polymers B and C are useful in the production of block and graft polymers and in curing unsaturated polyester resin-vinyl monomer systems. Polymer C forms block and graft polymers with vinyl monomers with substantially no formation of homopolymers. These block and graft polymers are compatibilizing agents for solutions of homopolymers.

3 Claims, No Drawings

3,890,294

AZO CONTAINING POLYBUTADIENES

This is a division of application Ser. No. 37,311, filed May 14, 1970 (now U.S. Pat. No. 3,752,802), which in turn is a continuation in part of application Ser. No. 667,352, filed Sept. 3, 1967 (now abandoned).

BACKGROUND OF THE INVENTION

This invention relates to azo compounds containing acylating functions. Also the invention relates to polymers containing one or more azo groups. Also the invention relates to the preparation of block and graft polymers utilizing such azo group containing polymers.

THE PRIOR ART

Two aromatic azo compounds containing an acid chloride function are known:

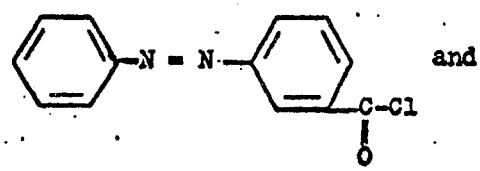

3-(phenylazo)benzoyl chloride

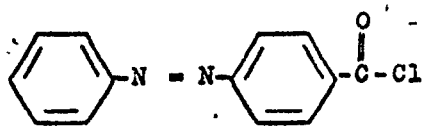

4-(phenylazo)benzoyl chloride

However, the aromatic azo compounds are thermally stable and do not decompose to give useful free radicals for vinyl monomer polymerizations. These aromatic azo acid chlorides cannot be used to make block and graft copolymers such as can be made using the novel azo compounds of this invention.

Donald A. Smith in a paper "The Thermal Decomposition of Azonitrile Polymers" published in *Die Makromolekulare Chemie* 103 (April 1967) 301–303 (Nr. 2468) reports the synthesis of 4,4'-azobis-4-cyanopentanoyl chloride. [This compound is named herein: 4,4'-azobis(4-cyanovaleryl chloride).] Smith gives no yields and identification other than melting point.

4,4'-azobis(4-cyanovaleric acid) is known and is prepared by the method of Haines and Waters, J. Chem. Soc., 1955, 4256 or Robertson, U.S. Pat. No. 2,520,338 (1950).

It has been found that this acid, as prepared by the classical procedure of Robertson, cannot be converted to the corresponding diacid chloride in sufficient purity to be useful. This is due to the fact that this acid is composed of different isomers, each varying in such properties as solubility, melting point, and chemical reactivity. Such theoretical considerations indicate that four isomers can exist (i.e. meso-cis, racemic-cis, meso-trans, and racemic-trans) when normal synthetic procedures are used i.e. when asymmetric syntheses are not involved (in which case even more isomers would be possible).

The initially formed acid was separated into a low melting (125°–127°C) and a high melting (141°–143°C) isomer by taking advantage of their difference in solubility in ethyl alcohol and ethyl acetate (see Example V). For purposes of clarity, the low melting isomer is hereinafter referred to as the cis isomer and the high melting as the trans isomer. Haines and Waters also separated I into two isomers, one melting at 110°–111°C and the other at 128°C by using 10 per cent aqueous methanol. They called their isomers meso and racemic.

Example VI and VII of the present specification show why this acid could not be completely converted to the diacid chloride. The cis isomer was heated for only 8 minutes with excess thionyl chloride in a preheated oil bath at 125°C and then rapidly cooled in an ice bath (Example VI). It was found that any longer exposures at the elevated temperatures resulted in rapid decomposition of the already completely formed diacid chloride of the cis acid isomer. The trans isomer on the other hand was exposed to a larger excess of refluxing thionyl chloride for one hour and still contained some unreacted acid which had to be filtered off. (Example VII). Thus, without first separating the low and high melting isomer of I, the diacid chloride is very difficult to prepare. This is evidenced by the fact that prior to the Smith publication, no aliphatic azo acid chlorides, chloroformates or anhydrides were in the literature.

Also, 2,2'-azobis(5-hydroxy-2-methylvaleronitrile) has been reported by Bamford et al, Trans. Faraday Soc. 56, (1960), 932–942, to exist in two isomeric forms but neither of these is known to have been converted to the corresponding bis(chloroformates), (see Example XIII).

SUMMARY OF THE INVENTION

COMPOUNDS "A"

$$R-N=N-\underset{R_2'}{\overset{R_2}{\underset{|}{C}}}-R_2''-X$$

where
(a) R is $$-\underset{R_2'}{\overset{R_2}{\underset{|}{C}}}-R_2''-X;$$

tertiary aliphatic having 4–10 carbon atoms, and tertiary-cycloaliphatic having not more than 10 carbon atoms;
b. $R_2$ is lower alkyl;
c. $R_2'$ is — CN,

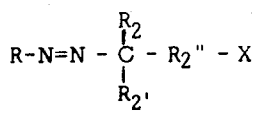

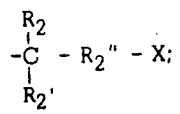

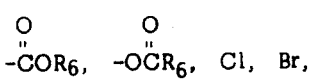

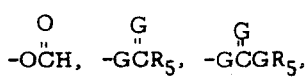

—GR$_5$, —N$_3$, —SCN, —NCS, —OCN, —OOR$_8$, —R$_5$,

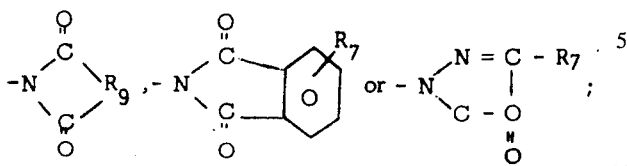

d. R$_2''$ is an aliphatic, aromatic, aromatic-aliphatic, or cycloaliphatic diradical (usually C$_1$–C$_{10}$ alkylene, C$_3$–C$_{10}$ cycloalkylene, C$_6$–C$_{12}$ aromatic diradicals or C$_7$–C$_{20}$ aromatic - alkyl diradicals);

e. X is

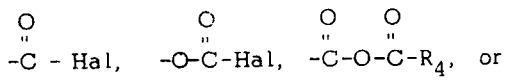

f. "Hal" is chloro or bromo;
g. R$_3$ is an aromatic, aliphatic or cyclo-aliphatic triradical;
h. R$_4$ is an aromatic or aliphatic radical;
i. G is oxygen or sulfur;
j. R$_5$ is an alkyl or cycloalkyl radical of up to 12 carbons or an aromatic radical of 6–12 carbons;
k. R$_6$ is a lower alkyl radical (normally having 1–6 carbons);
l. R$_7$ is H, an alkyl or cycloalkyl radical of 1–10 carbons or an aromatic radical of 6–12 carbons;
m. R$_8$ is a tertiary aliphatic radical (normally having 4–10 carbons);
n. R$_9$ is a lower alkylene diradical normally having 1–6 carbons; and
o. R$_2$ and R$_2''$ can, together with the tertiary carbon atom connected to the azo nitrogen atom, form a cycloaliphatic triradical of 3–10 carbons.

POLYMERS "B"

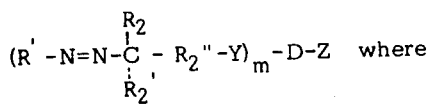

a. R' is tertiary aliphatic having 4–10 carbon atoms;
b. m is an integer from 1 to 100;
c. Z is a radical selected from — OH, —NH$_2$, —NHR$_2$, —SH, —OR$_2$ and —H;
d. D is a polymeric residue having a valence of $m + 1$;
e. Y is a divalent radical selected from

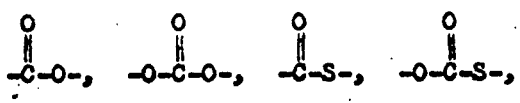

$$-\overset{O}{\overset{\|}{C}}-NH-, \quad -\overset{O}{\overset{\|}{C}}-\overset{R_2}{\underset{|}{N}}-, \quad -O-\overset{O}{\overset{\|}{C}}-NH-,$$

$$-O-\overset{O}{\overset{\|}{C}}-\overset{R_2}{\underset{|}{N}}-, \quad -O-\overset{O}{\overset{\|}{C}}-R_3-\overset{O}{\overset{\|}{C}}-O-,$$
$$\underset{COOH}{}$$

$$-O-\overset{O}{\overset{\|}{C}}-R_3-\overset{O}{\overset{\|}{C}}-NH; \quad -O-\overset{O}{\overset{\|}{C}}-R_3-\overset{O}{\overset{\|}{C}}-\overset{R_2}{\underset{|}{N}}-; \text{ and}$$
$$\underset{COOH}{} \qquad \underset{COOH}{}$$

$$-O-\overset{O}{\overset{\|}{C}}-R_3-\overset{O}{\overset{\|}{C}}-S-; \text{ and}$$
$$\underset{COOH}{}$$

f. R$_2$, R$_2'$, R$_2''$ and R$_3$ are as defined above.

POLYMERS "C"

$$Z-(E-Y-R_2''-\underset{\underset{R_2'}{|}}{\overset{\overset{R_2}{|}}{C}}-N=N-\underset{\underset{R_2'}{|}}{\overset{\overset{R_2}{|}}{C}}-R_2''-Y)_m-E-Z \quad \text{where}$$

where
a. E is a divalent polymeric residue; and
b. R$_2$, R$_2'$, R$_2''$, R$_3$, m, Z and Y are as defined above.

DETAILED DESCRIPTION OF THE INVENTION

Compounds A

These novel azo compounds have either one or two acylating functions "X".

The term "tertiary aliphatic" is intended to mean a radical:

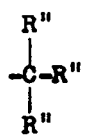

where R'' is an aliphatic or aromatic group, but only one R'' may be aromatic.

The term "tertiary cycloaliphatic" is intended to mean a radical illustrated by

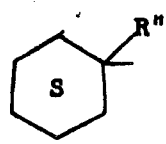

Illustrative t-aliphatic and t-cycloaliphatic groups are t-butyl; t-pentyl; t-decyl; 1-methylcyclohexyl; and the following

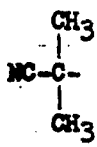 2-cyanoisopropyl
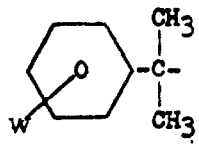 alpha,alpha-dimethylbenzyl and subst alpha,alpha-dimethylbenzyl
W=H, $NO_2$, $OR_5$, Cl, Br, $-\underset{H}{N}-\underset{\underset{O}{\|}}{C}CH_3$
 1-methylcyclopentyl
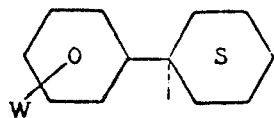 1-phenylcyclohexyl
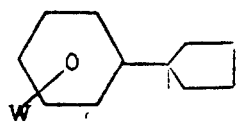 1-phenylcyclopentyl
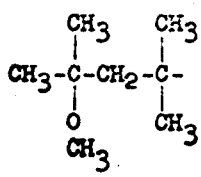 1,1,3-trimethyl-3-methoxybutyl
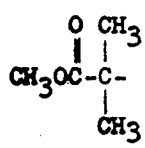 2-methoxycarbonylisopropyl
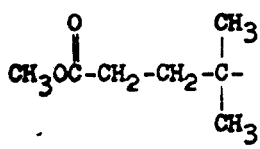 1,1-dimethyl-3-methoxycarbonylpropyl
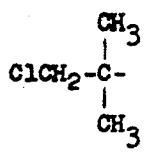 t-monochlorobutyl
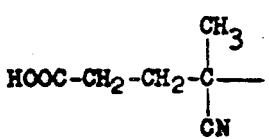 1-methyl-1-cyano-3-carboxypropyl Preferably R is a cyano-acylating group or t-alkyl having 4–10 carbon atoms or t-cycloalkyl having not more than 10 carbon atoms $R_2$ is lower alkyl; it may have as many as 8 carbon atoms but usually will have 1–6 carbon atoms. $R_2'$ may be any aliphatic, cycloaliphatic, or aromatic radical and particularly an alkyl or a phenyl radical and a cyano radical and also an alkoxy, aryloxy, acyloxy, alkoxycarbonyl, alkoxycarbonyloxy, aroyloxy, azido, chloro, bromo, thiocyanato, isothiocyanato, thioacyloxy, dithioacyloxy, alkoxythiocarbonyloxy, alkoxydithiocarbonyloxy, alkythio, arylthio, cyanato, tertiary-alkylperoxy, diacylimido or 2-substituted-1,3,4-oxadiazol-4-yl.

$R_4$ may be any aromatic or aliphatic radical— one which does not contain interfering substituents. More common are the unsubstituted, i.e., hydrocarbon aromatic and aliphatic radicals. Usually $R_4$ is phenyl or lower alkyl.

Any aromatic, aliphatic or cycloaliphatic triradical may be $R_3$. More common are the unsubstituted i.e., hydrocarbon, aromatic, cycloaliphatic or aliphatic radicals. Usually $R_3$ is a benzene hydrocarbon triradical, a saturated aliphatic triradical having not more than 10 carbon atoms, or a saturated cycloaliphatic triradical having not more than 10 carbon atoms.

The preparation of typical compounds A is set out in Examples I, VI, VII, XIII, XV, XVI, XvII, XVIII, and XX – XXXVII.

These novel azo compounds can be used in two general ways to make azo containing polymeric materials: 1.) They can be reacted with already formed polymeric materials containing terminal or pendant free hydroxyl, amino, mercapto, or any other functional groups that are easily acylated (Examples II and X) and 2.) The azo compounds containing two acylating groups can be used in conjunction with other difunctional monomers in polymer condensation reactions to obtain condensation polymers (e.g. polyamides, polyesters, polycarbonates, etc.) containing intermittant azo linkages along the backbone (Examples VIII and IX).

Polymers B

Polymers B are prepared by the reaction of a polymer having at least one group reactive with an acyl group and a compound A having only one acylating function.

D is an $m + 1$ valent polymeric residue such as a polyether, polyester, polyamide, polycarbonate, polybutadiene, polystyrene, poly(vinyl alcohol), partially hydrolyzed poly(vinyl acetate), cellulose, polybutadiene-polystyrene copolymer, and any other polymeric material. More specifically polyether containing aliphatic, cycloaliphatic, aromatic, and heterocyclic diradicals linked to the oxygen atoms; polyester, such as prepared from aliphatic, cycloaliphatic, aromatic, and heterocyclic dibasic acids and dihydroxy compounds; polyamide, such as prepared from aliphatic, cycloaliphatic, aromatic, and heterocyclic dibasic acids and diamines; polycarbonate, such as prepared from aliphatic, cycloaliphatic, aromatic, and heterocyclic dihydroxy compounds and phosgene or aliphatic, cycloaliphatic, aromatic and heterocyclic bis(chloroformate).

Illustrative polymers B are prepared in Examples II and XIX.

Polymers C

Polymers C are prepared by the reaction of a monomer having two groups reactive with an acyl group and a "Compound A" having two acylating functions and another monomer having two acylating functions; and also by the reaction of a polymer having at least one group reactive with an acyl group and a "Compound A" having two acylating functions.

Illustrative polymers C are prepared in Examples VIII, IX and X.

It is to be understood that in the preparation of Polymers B and C, the conventional conditions for acylating function reactions are used. Temperatures or other conditions known to cause decomposition of the azo linkage, naturally, are avoided.

Polymers B and C can be used in making graft and block polymers. Also they are useful as sources of free radicals in the curing (thermosetting) of unsaturated polyester-vinyl monomer blends and in the curing of rubbers. The curing of an unsaturated polyester-vinyl monomer blend is illustrated by Example III. These block and graft copolymers are useful as compatibilizing agents. The great majority of homopolymers are incompatible with each other. However, when block and/or graft copolymers of two incompatible homopolymers are present, the system becomes much more, if not completely, compatibilized (see Examples IV and XI).

D. Method of Preparing Block and Graft Polymers

These novel azo containing polymers B and C can be used to make block and graft copolymers by treating them with polymerizable vinyl-type monomers under conditions where the azo-carbon linkage is decomposed (ruptured) into free radicals at a rate and temperature suitable for polymerizing the vinyl monomer itself. Suitable vinyl-type monomers include: styrene, butadiene, isoprene, acrylonitrile, vinyl chloride, ethyl acrylate, methyl methacrylate, vinyl acetate, acrylic acid, vinyl stearate, vinylidene chloride, and the like may be used.

Any of the conventional procedures for rupturing the azo-carbon linkage, such as heating to the proper temperature and ultra violet irradiation may be used.

Illustrative block and graft polymers are prepared in Example III, IV and XI.

It is known that when two different polymers are brought in solution — really a dispersion because of the low solubility of polymer in the common organic solvents — in a common solvent, over a period of time the solution segregates into two layers, having different polymeric compositions. Apparently homogeneous melts of two different polymers frequently on solidifying show undesired segregation or heterogeneous dispersion of one polymer throughout the continuous phase of the other polymer. Since physical mixtures (dispersion) of two different polymers afford very desirable physical properties, if a homogeneous mass is maintained, stability of the dispersion is of importance. A "third" component of the mix which improves the dispersion stability of the mix is known as a stabilizer — in certain special areas, the stabilizer is referred as a compatibility agent.

The ability to stabilize is tested in the laboratory by empirical tests where the "stabilized" solution is compared to a control solution. The time for the appearance of two distinct layers is measured. It is to be emphasized that the results cannot be used to compare effectiveness in different polymeric systems, since even polymer molecular weight can cause substantial changes in separation time between two systems made from the same monomers. However the laboratory tests are meaningful in terms of screening potential stabilizers.

An important utility of the block and graft polymers made by the method of the invention is as stabilizers (compatibilizers) of solutions of different homopolymers. This utility is demonstrated by Examples IV and XI.

EXAMPLES

EXAMPLE I

Preparation of 4-t-Butylazo-4-cyanovaleryl chloride

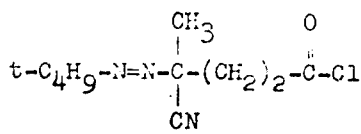

Method A

Into a 25 ml round bottom flask was weighed 5g (.0237m) of 4-t-butylazo-4-cyanovaleric acid and then 15 ml benzene and 2 ml thionyl chloride were added. The acid dissolved and the solution was stirred for 4 hours at room temperature (protected from the atmosphere by a CaCl$_2$ tube). At the end of the stirring period the benzene and excess thionyl chloride were stripped off leaving 5.35g (98.8% yield) of a light brown liquid. The infrared spectrum indicated that all of the acid had been converted to the acid chloride. The product is unstable at room temperature for long periods of time but is stable at 5°C or below.

Method B

Into a 500 ml. erlenmeyer flask equipped with a reflux condenser and drying tube was slurried 105.5 grams (0.5 moles) of 4-t-butylazo-4-cyanovaleric acid in 300 ml. of pentane. To the slurry was added 105.0 grams (0.503 moles) of phosphorous pentachloride in small increments over a 15 minute period. The reaction was stirred for 1 1/2 hour at room temperature, during which time the solids completely dissolved. The pentane solution was washed with ice cold water, cold saturated NaHCO$_3$ dried over anhydrous Na$_2$SO$_4$, filtered and the pentane evaporated to leave 109 grams (95% yield) of the desired acid chloride.

To a solution of 17.6g (0.132 equivalent) of a hydroxyl-terminated polybutadiene liquid resin (equivalent weight = 1330) [Sinclair R-15M resin]; this contained approximately 0.75 meq. OH per gram; and 10 ml of pyridine in 150 ml ether; was added 3.05g (.0132m) of 4-t-butylazo-4-cyanovaleryl chloride. The solution became cloudy and a precipitate of pyridine hydrochloride slowly formed. The reaction mixture was stirred an additional 5 hours and the pyridine hydrochloride filtered off. The product had poor solubility in the ether so the ether was evaporated off and the residue redissolved in methylene chloride. The methylene chloride solution was washed with 10% HCl to remove the excess pyridine, then with water, sodium bicarbonate solution, water again, dried over anhydrous sodium sulfate, filtered, and the methylene chloride evaporated off. The yield was 16.9g (85%). The infrared spectrum was in agreement with the structure of the expected product (strong carbonyl band at 1,740 cm$^{-1}$ and no OH band).

EXAMPLE III

Curing An Unsaturated Polyester-Styrene Resin with the Azo-Containing Telechelic Polybutadiene of Example II The unsaturated polyester resin was made by reacting maleic anhydride (1.0 mole), phthalic anhydride (1.0 mole), and propylene glycol (2.2 moles) until an acid number of 45–50 was obtained. To this was added hydroquinone at a 0.013% concentration. To seven parts of this unsaturated polyester was added three parts of monomeric styrene to obtain a homogeneous blend having a viscosity of 13.08 poise and a specific gravity of 1.14.

To 20 grams of this blend was added 0.32 grams of the polybutadiene telechelic polymer of Example II and the mixture stirred up well and placed in a constant temperature bath at 212°F. The internal temperature was recorded as a function of time and a peak exotherm of 350°F was reached in 10.9 minutes indicating a cure of the unsaturated polyester-styrene resin blend had occurred.

In the absence of the polymer, no cure of this resin blend occurred after more than 30 minutes at 212°F.

EXAMPLE IV

Preparation of a Polybutadiene-Polystyrene Block Copolymer from the Azo-Containing Telechelic Polymer of Example II

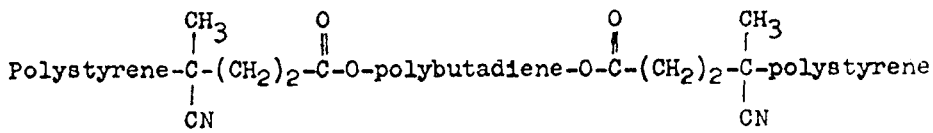

EXAMPLE II

Preparation of a Polybutadiene Telechelic Polymer Terminated with Ester End Groups Containing an Aliphatic Azo Group.

1. A solution of 10 grams of the polybutadiene telechelic polymer of Example II in 50 grams of styrene was heated at 75°C for 2.5 hours in a nitrogen atmosphere.

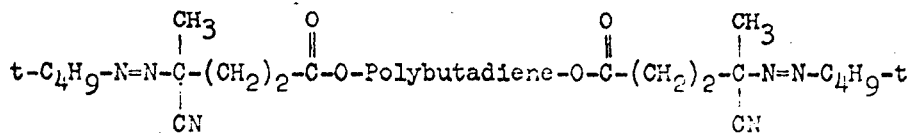

The resulting block copolymer stabilized a homopolymer solution of 50% styrene and 50% polybutadiene for more than 8 hours. This stabilizing effect indicated the presence of a block copolymer of polybutadiene and polystyrene.

2. A control sample was prepared by polymerizing a mixture of 10 grams of Sinclair R-15M resin and 50 grams of styrene with 1.5 grams of ethyl 4-t-butylazo-4-cyanovalerate (a non-polymer azo of similar structure to that of Example II) under the same reaction conditions. The resulting polymer did not stabilize the polybutadienestyrene homopolymer solution and phase separation of the two homopolymer solutions occurred in 15 minutes.

EXAMPLE V

Preparation of cis- and trans-4,4'-Azobis-(4-cyanovaleric acid)

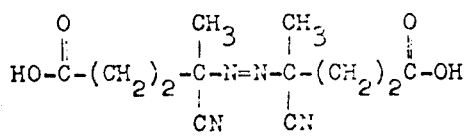

A solution of 154.8g (1.32m) levulinic acid, 53.2g (1.32m) sodium hydroxide and 21.8g (0.66m) of 97% hydrazine was refluxed in an oil bath for 5 hours. The solution was cooled to room temperature, 160 ml HCN added, and the reaction stirred overnight. The solution was then made acid with a few ml of concentrated HCl and the excess HCN was stripped off under aspirator vacuum, trapping the volatile HCN in a dry ice trap. After most of the excess HCN had been stripped off, the solution was made basic again with 50% NaOH and chlorine passed into the system. The temperature was controlled below 15°C by means of an ice bath and the chlorine was passed in until the exotherm ceased (approximately 85g or 1.2m). During the oxidation, a solid precipitated out of solution. The solid was filtered off, washed once with cold water and air dried. The crude yield was 140g (76% yield) of a light brown powder having a melting range of 118°–125° C. Repeated recrystallizations from ethyl alcohol and ethyl acetate separated the product into two pure isomeric forms, one melting at 141°–143°C (35g from ethanol) and the other at 125°–127°C (22.5g from ethyl acetate). The higher melting isomer was also the less soluble isomer and was therefore assigned the trans structure. (Separation of these cis- and trans-azo acids was also accomplished with ether in which the trans isomer is completely insoluble.)

The infrared spectra of the two isomeric 4,4'-azobis-(4-cyanovaleric acids) were consistent with their structures and definitely showed that they are pure and discrete compounds.

EXAMPLE VI

Preparation of Cis-4,4'-Azobis-(4-cyanovaleryl chloride)

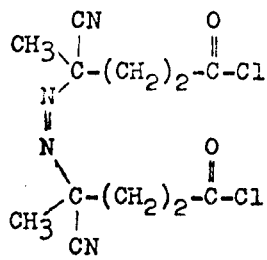

A 500 ml 3 neck flask containing 20.7g (0.74m) of cis-4,4'-azobis-(4-cyanovaleric acid), 120 ml thionyl chloride, a magnetic stirring bar, a thermometer, and a condenser with a drying tube, was immersed into an oil bath preheated to 125°C. At the end of 8 minutes complete solution was obtained and the oil bath was rapidly replaced by an ice bath. The solution was cooled to room temperature and the excess thionyl chloride stripped off. The residue was slurried in benzene and the benzene stripped off. The resulting solid was dissolved in warm benzene and then precipitated out with pentane. The solid was filtered off and dried in a vacuum dessicator over calcium chloride. The yield was 20.7g (88.4% yield) of a white powder with a melting range of 88°–90°C (dec.). The infrared spectrum indicated that the acid had been converted to the acid chloride completely.

EXAMPLE VII

Preparation of Trans-4,4'-Azobis-(4-cyanovaleryl chloride)

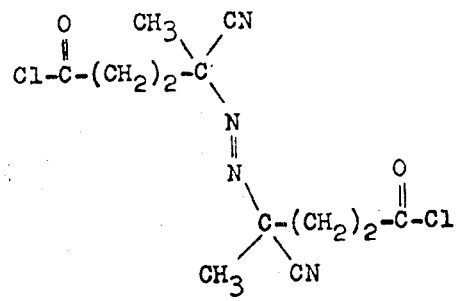

A mixture of 10g (.038m) trans-4,4'-azobis-(4-cyanovaleric acid) and 200 ml thionyl chloride in a 500 ml round bottom flask containing a magnetic stirring bar and a condenser with a drying tube, was refluxed for 1 hour in a 100°C oil bath. The resulting solution was filtered while still warm and the excess thionyl chloride stripped from the filtrate. The residue was slurred in benzene and stripped to dryness. The resultant solid was dissolved in warm benzene, filtered and precipitated back out with pentane. The solid was filtered off and dried in a vacuum dessicator over calcium chloride. The yield was 5.4g (47.5% yield) of a white powder with a melting range of 81°–83°C (dec.). The infrared spectrum indicated that the acid had been converted completely to the acid chloride. The infrared spectrum of trans-4,4'-azobis-(4-cyanovaleryl chloride) differed from that of the cis acid chloride. The strong bands in the spectra were similar but there was considerable variation in some of the weaker bands.

EXAMPLE VIII

Preparation of a Polyamide Containing Aliphatic Azo Groups

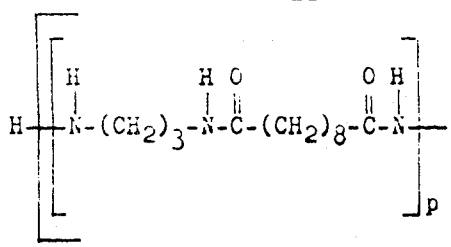

A solution of 6.0g (.025m) sebacic acid diacid chloride and 1.6g (.005m) trans -4,4'-azobis-(4-cyanovaleryl chloride) in 25 ml benzene was added dropwise to a stirred solution of 3.0g (.075m) sodium hydroxide and 2.22g (.030m) 1,3-propane diamine. The polyamide began to form immediately and chunks of the insoluble polymer had to be removed periodically so that stirring could continue. At the end of the reaction the polyamide was filtered off. The polymer chunks were slurried in methanol until a small particle size was obtained. The methanol was decanted off and the remaining solid air dried. The yield of dried product was 9.2g (94% yield).

The polyamide did not melt below 270°C although some portions softened between 65° and 150°C and the material turned brown. (A control sample of polyamide prepared from equivalent amounts of sebacic acid diacid chloride and 1,3-propane diamine did not discolor upon heating.)

The presence of the azo groups in the polyamide was established by comparing the UV spectra of the azo containing polyamide and the control sample. Equal portions of the two polyamides were dissolved in 97% formic acid and the UV spectra run. The polyamide made from the mixture of sebacic acid diacid chloride and trans -4,4'-azobis-(4-cyanovaleryl chloride) had a strong UV absorbtion at 345–370 mu due to the azo linkage while the control sample did not.

EXAMPLE IX

Preparation of a Polyester Containing Aliphatic Azo Groups

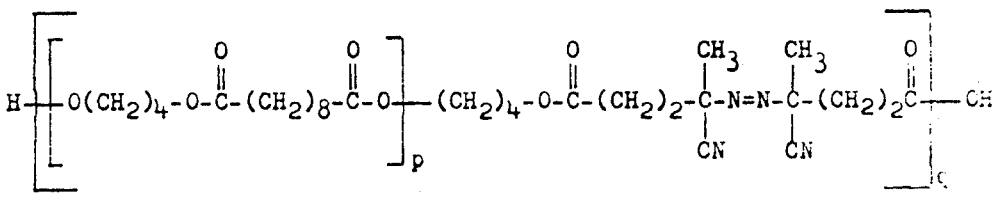

A solution of 6.0g (.025m) sebacic acid diacid chloride and 1.6g (.005m) trans -4,4'-azobis-(4-cyanovaleryl chloride) in 50 ml benzene was added dropwise to a solution of 2.7g (.030m) 1,4-butanediol and 6.0g (.075m) pyridine in 100 ml ether. The reaction was stirred 1 hour and the pyridine hydrochloride filtered off. The solvent was evaporated off and the product taken up in methylene chloride (in which it was more soluble) washed successively with dilute HCl, water, NaHCO₃ solution, and dried over anhydrous sodium sulfate. The methylene chloride solution was filtered and the methylene chloride evaporated off leaving 8.0g (98.7% yield) of a low melting wax. The infrared spectrum is consistent with a polyester structure. The material begins to evolve gas slowly at 70°C and the gas evolution becomes rapid as the temperature is raised above 100°C.

EXAMPLE X

Preparation of a Polyether Containing an Internal Aliphatic Azo Group

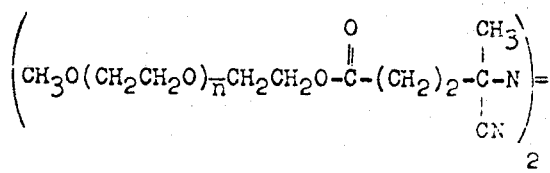

To a solution of 7.5g (.01m) of a monohydroxyl terminated polyether (molecular weight 715–785) [Union Carbide Carbowax 750] and 1.2g (.015m) pyridine was added 1.6g (.005m) of trans-4,4'-azobis-(4-cyanovaleryl chloride). The reaction was stirred 1 hour after the addition was over. The product only had partial solubility in ether so the ether was stripped off and the residue dissolved in methylene cloride. The methylene chloride solution was successively washed with 5 ml 10% HCl, 5 ml water, 5 ml 10% NaHCO₃ solution, and 5 ml water. The methylene chloride solution was dried over anhydrous sodium sulfate, filtered, and the methylene chloride evaporated off, leaving 7.7g (88.5% yield) of low melting semi-solid. The product evolves nitrogen slowly at 85°C and very rapidly above 95°C. The infrared spectrum is consistent with the structure of the proposed product. It contains a moderate carbonyl band in the ester range and a very strong ether band. The product has appreciable water solubility.

EXAMPLE XI

Preparation of a Block Copolymer of Polystyrene and Poly(ethylene oxide)

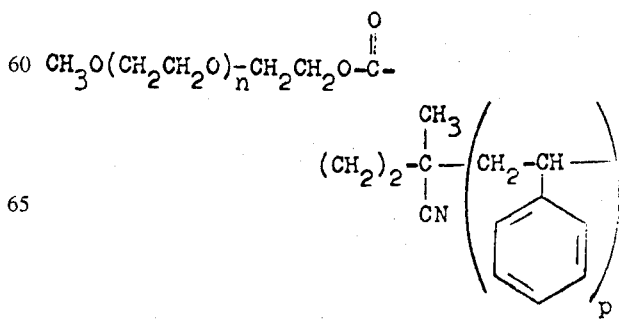

A solution containing 7.0g of the azo containing polyether product of Example X in 14.0g of styrene was placed in a sealed tube under nitrogen at 60°–65°C for 17 hours to obtain 21.0 grams (100% yield) of a block copolymer of polystyrene and poly(ethylene oxide).

A control, using only styrene with no initiator, gave less than 20% polystyrene under these conditions.

When a 40% solution of polystyrene in chloroform was mixed with a 40% solution of Carbowax 750, demixing (separation of layers) occurred in 30 minutes.

A 40% solution of the above block copolymer did not separate into layers after seven days.

When 40% solution of polystyrene, Carbowax 750, and the block copolymer were mixed, demixing did not occur until 22.5 hours had elapsed. Therefore, the block copolymer is a good compatibilizing agent for polystyrene and polyether homopolymers, which are normally incompatible.

EXAMPLE XII

Preparation of 2,2'-Azobis(5-hydroxy-2-methylvaleronitrile)

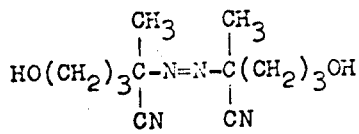

This known compound was prepared by modifying the literature procedure wherein sodium hypochlorite was used instead of bromine in the final oxidation step.

EXAMPLE XIII

Preparation of 4,4'-Azobis(4-cyano-n-pentyl chloroformate)

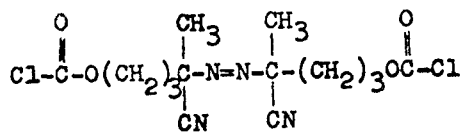

To 25 ml of liquid phosgene in a 100 ml 4 neck round bottom flask equipped with a thermometer, magnetic stirring bar, dry ice condenser and dropping funnel was added a solution of 5 g. (.0198 m) 2,2'-azobis(5-hydroxy-2-methylvaleronitrile) (from XII) in 25 ml methylene chloride over 1 hour, holding the temperature at 0°C with an ice bath. After the addition was complete, the reaction was stirred an additional 1½ hours, letting the temperature slowly rise to room temperature. The dry ice condenser was removed and the excess phosgene stripped off with a water aspirator. The resultant methylene chloride solution was dried over anhydrous Na$_2$SO$_4$, filtered and the methylene chloride stripped off to leave 7.3 g. (98% yield) of a liquid. The infrared spectrum of the product was in agreement with that of 4,4'-azobis(4-cyano-n-pentyl chloroformate).

EXAMPLE XIV

Preparation of 2-t-Butylazo-2-cyano-5-hydroxypentane

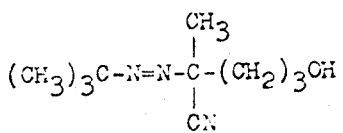

To a stirred solution containing 5.1g (0.05 mole) of 3-acetyl-1-propanol in 25 ml of water was added 7.35g of 84.3% t-butylhydrazine hydrochloride followed by the addition of 2.5g of sodium cyanide. The stoppered reaction was allowed to stir at room temperature overnight. The formed 2-t-butylhydrazo-2-cyano-5-hydroxypentane was extracted from the reaction mixture with methylene chloride.

The methylene chloride extracts were combined, washed with water, and concentrated to about 40 ml. This solution was cooled to 0°C and then 0.075 mole of a 10% sodium hypochlorite solution added, keeping the temperature below 10°C. Stirring was continued while the reaction mixture was allowed to warm to 30°C (1 hour) and then stirred at 30°C for 3 hours. The methylene chloride layer was then separated and washed successively with 10% hydrochloric acid, saturated sodium bicarbonate and water. After drying, the solvent was evaporated to leave 6.2g of product whose infrared spectrum was in agreement with the structure of 2-t-butylazo-2-cyano-5-hydroxypentane.

EXAMPLE XV

Preparation of 4-t-Butylazo-4-cyanopentyl chloroformate

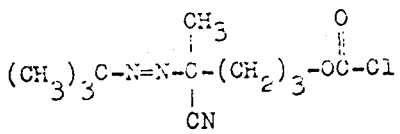

To 15 ml of liquid phosgene in a 50 ml round bottom flask, equipped with a thermometer, magnetic stirring bar, dry ice condenser and dropping funnel, was added 5 g. (.0254 m) of 2-t-butylazo-2-cyano-5-hydroxypentane (from XIV) over 1 hour, holding the temperature at 0°C with an ice bath. After the addition was complete, the reaction was stirred an additional 1½ hours, letting the temperature slowly rise to room temperature. The dry ice condenser was removed and the excess phosgene stripped off with a water aspirator. The chloroformate was taken up in pentane, dried over anhydrous Na$_2$SO$_4$, filtered and the pentane stripped off to give 5.4 g. (82% yield) of 4-t-butylazo-4-cyanopentyl chloroformate which assayed 92.4%.

EXAMPLE XVI

Preparation of 4-(4-t-Butylazo-4-cyanopentoxycarbonyl)phthalic Anhydride

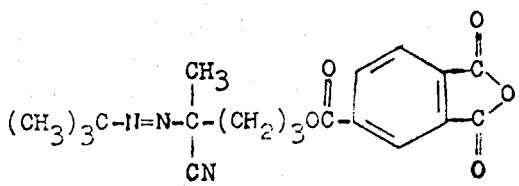

To a solution of 2.1 g. (.01 m) of 4-chloroformylphthalic anhydride in 25 ml ether in a 50 ml 4-neck round bottom flask equipped with a condenser containing a $CaCl_2$ drying tube, a thermometer, a magnetic stirring bar and a dropping funnel was added a solution of 2.0 g. (.01 m) 2-t-butylazo-2-cyano-5-hydroxypentane (from XIV) and 0.8 g. (.01 m) pyridine in 10 ml ether. This solution was added dropwise with stirring over 15 minutes holding the temperature between 15 and 22°C with a water bath. The reaction was stirred an additional hour after the addition was completed and the pyridine hydrochloride filtered off. The ether filtrate was dried over anhydrous $Na_2SO_4$, filtered and evaporated to dryness leaving 3.1 g. (84%) of a viscous liquid. The infrared spectrum contained 3 carbonyl bands and no OH bands.

The product cured the polyester resin of Example III in 2.7 minutes at 100°C when used at a 1% concentration by weight. A peak exotherm of 422°F was reached and the cured piece was very hard.

EXAMPLE XVII

Preparation of 4-t-Butylazo-4-cyanovaleroyl pivaloyl anhydride

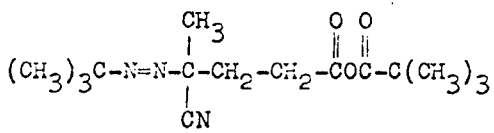

To a solution of 5.0 g. (.0237 m) 4-t-butylazo-4-cyanovaleric acid and 1.87 g. (.0237 m) pyridine in 25 ml benzene in a 4 neck round bottom flask equipped with a magnetic stirring bar, condenser containing a $CaCl_2$ drying tube and a dropping funnel was added 2.86 g. (.0237 m) pivaloyl chloride. The pivaloyl chloride was added dropwise from the dropping funnel over 15 minutes. The temperature rose from 25° to 30°C during the addition. The reaction was stirred an additional 3 hours at room temperature, the pyridine hydrochloride filtered off and the benzene stripped off on a flash evaporator. The viscous liquid was dissolved in 30 ml pentane and stored in the freezer overnight. A white solid crystallized out overnight. The solid was filtered off to give 2.4 g. of a solid having a melting range of 76°–81°C. Further concentration of the pentane filtrate gave more of the product. The infrared spectrum of the product was in agreement with that of an anhydride.

The product at a 1% by weight concentration cured the polyester resin of Example III in 10.1 minutes at 82°C. A peak exotherm of 385°F was reached and the cured piece was very hard.

EXAMPLE XVIII

Preparation of 2,2'-Azobis(2-methylpropyl chloroformate)

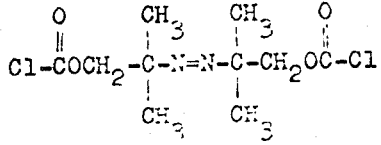

To 25 ml liquid phosgene, cooled to −10°C, in a 250 ml 4 neck round bottom flask equipped with a thermometer, magnetic stirring bar, dry ice condenser and dropping funnel was added a solution of 5.0 g. (.0287 m) of 2,2'-azobis(2-methylpropanol) in 85 ml of anhydrous ether over 45 minutes holding the temperature below −5°C. After the addition was complete, the reaction was stirred an additional 3 hours, allowing the temperature to slowly rise to room temperature. The dry ice condenser was removed and the excess phosgene stripped off with a water aspirator. The resultant ether solution was dried over anhydrous $Na_2SO_4$, filtered and the ether stripped off to leave 7.5 g. (87½% yield) of a liquid product.

The infrared spectrum was in agreement with that of 2,2'-azobis(2-methylpropyl chloroformate). The spectrum contained a strong carbonyl band at 1,780 cm$^{-1}$ and no OH bands.

EXAMPLE XIX

Preparation of a Polyether Containing a Terminal Aliphatic Azo Group

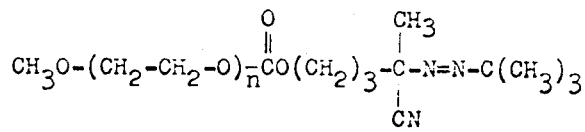

To a solution of 7.5 g. (.01 m) of the monohydroxyl terminated polyether of Example X, 0.8 g. (.01 m) pyridine in 50 ml ether and 10 ml methylene chloride in a 100 ml round bottom flask was added a solution of 2.6 g. (.01 m) of 4-t-butylazo-4-cyano-n-pentyl chloroformate in 15 ml ether over 15 minutes. The reaction was stirred 1 hour and the pyridine hydrochloride filtered off. The filtrate was stripped to dryness and the residue redissolved in 50 ml methylene chloride. The methylene chloride solution was washed with 1% HCl, sat'd $NaHCO_3$ solution, sat'd NaCl solution, dried over $Na_2SO_4$, filtered and the methylene chloride stripped off to leave 8.5 g. (87.5%) of a waxy solid.

The infrared spectrum was in agreement with that of the desired polyether, i.e. strong carbonyl at 1,740 cm$^{-1}$, very little OH, and the carbon-chlorine band at 680 cm$^{-1}$ of the chloroformate was missing.

The product at a 5% by weight concentration cured the polyester resin of Example III in 4.1 minutes at 100°C. A peak exotherm of 419°F was reached and the cured piece was very hard.

EXAMPLE XX

Preparation of 4-t-Butylazo-4-(p-t-butylthiophenoxy)valeryl chloride

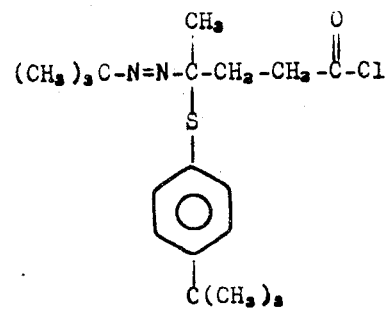

A. Preparation of the t-butylhydrazone of butyl levulinate

An aqueous solution of 1200g. of 8.1% t-butylhydrazine was added to 172 grams of butyl levulinate in a two liter round bottom flask equipped with a mechanical stirrer, thermometer, and reflux condenser. The reaction mixture was heated in an oil bath at 100°C for 2 hours and then cooled to room temperature. The dark organic layer was separated, dried over anhydrous Na₂SO₄ and filtered. The product filtrate weighed 212 grams (87.5% yield).

B. Preparation of n-butyl 4-t-butylazo-4-chlorovalerate

Into a solution of 121 grams (0.5 moles) of the above t-butylhydrazone in pentane cooled to −20°C was slowly passed 17.8 grams (0.25 moles) of chlorine with rapid stirring. The addition required 30 minutes and the reaction was stirred an additional 15 minutes at −20°C, slowly warmed to −5°C and the white solid which formed was filtered off. The pentane filtrate was dried over anhydrous Na₂SO₄, filtered and the pentane evaporated to leave 62 grams (45% yield) of n-butyl 4-t-butylazo-4-chlorovalerate.

C. Preparation of n-butyl 4-t-butylazo-4(p-t-butylthiophenoxy)-valerate.

To a stirred solution of 36.2 grams (0.55 moles) of 85% potassium hydroxide in 200 ml. of methanol in a 2 liter jacketed reactor was added with cooling 91.5 grams (0.55 moles) of para-t-butylthiophenol. After the addition was complete the reaction was stirred for 20 minutes. Then a solution of approximately 138.25 grams (0.5 moles) of n-butyl 4-t-butylazo-4-chlorovalerate (prepared as in step B) in 1000 ml. of pentane was added over a 20 minute period, holding the temperature at 10°–20°C by circulating cold water through the reactor jacket. After the addition was complete the reaction was stirred for an hour at 15°–20°C, a 600 ml. portion of water added and the reaction stirred until the salts dissolved. The pentane layer was separated, washed with water, 5% HCl, water, dried over anhydrous Na₂SO₄, filtered and the pentane evaporated to leave 167 g. (83% yield) of n-butyl 4-t-butylazo-4-(p-t-butylthiophenoxy)valerate.

D. Preparation of 4-t-butylazo-4-(p-t-butylthiophenoxy)valeric acid

A mixture of 167 grams (0.412 moles) of n-butyl 4-t-butylazo-4-(p-t-butylthiophenoxy)valerate and 34.4 grams (0.43 moles) of 50% NaOH were stirred in a 500 ml. round bottom flask, equipped with a condenser, for 4 hours at 85°–90°C. The reaction mixture was then cooled to room temperature and poured into 400 ml. water. The aqueous solution was extracted with 100 ml. of pentane to remove any unreacted ester and butyl alcohol and the pentane layer discarded. The aqueous layer was acidified to a pH of 3. The desired acid precipitated out of solution, was filtered off, washed with water and air dried. The dry product weighed 107 grams (74% yield).

E. Preparation of 4-t-butylazo-4-(p-t-butylthiophenoxy)valeryl chloride

Into a 50 ml. round bottom flask were added 10.5 grams (.03 moles) of 4-t-butylazo-4-(p-t-butylthiophenoxy)valeric acid, 25 mls. of pentane, and with gentle stirring 5.9 grams (.0283 moles) of PCl₅. The flask was equipped with a reflux condenser containing a drying tube and the reaction stirred for 1 hour at room temperature. At the end of the reaction period, the pentane solution was washed with ice cold water, cold saturated NaHCO₃ solution, dried over anhydrous sodium sulfate, filtered and the pentane evaporated to leave 10.8 grams (98% yield) of the desired acid chloride.

EXAMPLE XXI

Preparation of 4-t-Butylazo-4-thiophenoxyvaleryl chloride

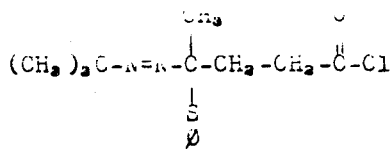

This compound was prepared in the same way that the compound in Example XX was prepared except that thiophenol was used in step C instead of para-t-butylthiophenol

EXAMPLE XXII

Preparation of 4-t-Butylazo-4-dodecanethiovaleryl chloride

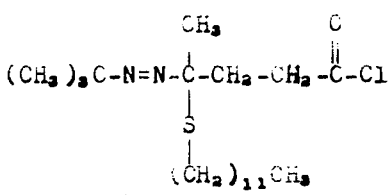

This compound was prepared in the same way that the compound in Example XX was prepared except that dodecanethiol was used in step C instead of a para-t-butylthiophenol.

EXAMPLE XXIII

Preparation of 4-t-Butylazo-4-octylthiovaleryl chloride

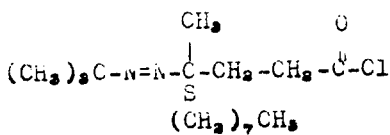

This compound was prepared in the same way that the compound in Example XX was prepared except that 1-octanethiol was used in Step C instead of para-t-butylthiophenol.

EXAMPLE XXIV

Preparation of 4-t-butylazo-4-azidovaleryl chloride

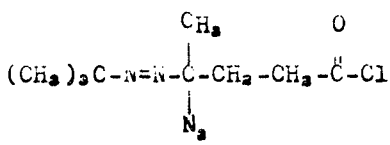

A. Preparation of n-butyl 4-t-butylazo-4-azidovalerate

To a solution of 20.2 grams (.31 moles) of sodium azide in 200 ml. of 70% aqueous methanol cooled in an ice bath, was added dropwise 80.0 grams (.29 moles) of n-butyl 4-t-butylazo-4-chlorovalerate (prepared as in Example XX) over a 20 minute period. After the addition was complete the reaction mixture was stirred for 1 hour at 15°C. It was then poured into 500 ml. of water and extracted with pentane. The pentane solution was washed with water, saturated NaHCO₃ solution, water, dried over anhydrous sodium sulfate, filtered and the pentane evaporated to leave 77 grams (93.7% yield) of the desired product.

B. Preparation of 4-t-butylazo-4-azidovaleric acid

A mixture of 73.3 grams (0.223 moles) of n-butyl 4-t-butylazo-4-azidovalerate and 38.4 grams (0.24 moles) of 25% NaOH in a 250 ml. round bottom flask were warmed to 80°C in an oil bath. The mixture was stirred for 90 minutes at 80°C and then cooled to room temperature. It was then poured into 200 ml. of water and the aqueous solution extracted with 50 ml. of methylene chloride and the methylene chloride layer discarded. The aqueous solution was acidified with concentrated HCl to a pH of 3 and then extracted with pentane. The pentane solution was dried over anhydrous sodium sulfate, filtered and the pentane evaporated to leave 48.0g (92.4% yield) of a light yellow solid.

C. Preparation of 4-t-butylazo-4-azidovaleryl chloride

Into a 50 ml. round bottom flask were added 6.9 grams (.0304 moles) of 4-t-butylazo-4-azidovaleric acid, 25 mls. of pentane and with gentle stirring 6.8 grams (.033 moles) of PCl₅. The flask was equipped with a reflux condenser containing a drying tube and the reaction stirred for 1½ hours at room temperature. At the end of the reaction period, the pentane solution was washed with ice cold water, cold saturated NaHCO₃ solution, dried over anhydrous sodium sulfate, filtered and the pentane evaporated to leave 6.9 grams (94% yield) of the desired acid chloride.

EXAMPLE XXV

Preparation of 4-t-Butylazo-4-phenylvaleryl chloride

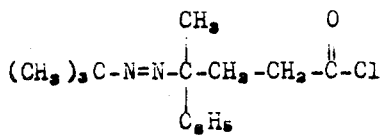

A. Preparation of n-butyl 4-t-butylazo-4-phenylvalerate

To a clean, dry, 500 ml, 4-neck round bottom flask equipped with a mechanical stirrer, thermometer, condenser with drying tube and under a nitrogen atmosphere was added a solution of 70 grams (0.253 moles) of n-butyl 4-t-butylazo-4-chlorovalerate (prepared as in Example XX) in 200 ml. of pentane and the solution cooled to 5°C. With rapid stirring 86.6 ml. (0.26 moles) of a 3 molar solution of phenylmagnesium bromide in ether was added from a dropping funnel over 1/2 hour holding the reaction temperature at 10°–15°C. with an ice bath. After the addition was complete, the reaction was stirred for an additional 45 minutes at 15°C. Ice chips were then added to the stirred reaction until the excess phenylmagnesium bromide was destroyed. The reaction mixture was then stirred into 200 ml. of 5%

HCl until the magnesium salts dissolved. The pentane layer was separated, washed with 5% HCl, water, dried over anhydrous sodium sulfate, filtered and the pentane evaporated to leave 53 grams (66% yield) of product.

B. Preparation of 4-t-butylazo-4-phenylvaleric acid

The above ester, 51 grams (0.16 moles) was saponified with 50% NaOH over 4 hours at 70°C to give 12.0 grams of the desired acid. The yield was low due to the low decomposition temperature of the azo group.

C. Preparation of 4-t-butylazo-4-phenylvaleryl chloride

The acid chloride was prepared in 86% yield from the above acid using the procedure described in examples XX and XXIV.

EXAMPLE XXVI

Preparation of 4-t-Butylazo-4-methylvaleryl

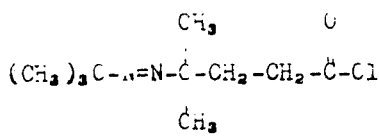

This compound was prepared in the same manner as the 4-phenyl derivative described in Example XXV except methylmagnesium bromide was used instead of phenylmagnesium bromide in step A. The yield in step A was 63%. The ester was saponified and the resulting acid converted to the acid chloride with PCl₅ in pentane.

EXAMPLE XXVII

Preparation of 4-t-Butylazo-4-methoxyvaleryl chloride

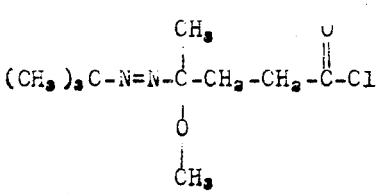

A. Preparation of n-butyl 4-t-butylazo-4-methoxyvalerate

To a stirred solution of 19.7 grams (0.3 moles) of 85% KOH in 150 ml. of methanol cooled in an ice bath was added 80 grams (0.29 moles) of n-butyl 4-t-butylazo-4-chlorovalerate (prepared as in Example XX) dropwise over ½ hour. The reaction mixture was stirred an additional ½ hour after the addition was complete, poured into 300 ml. of water and extracted with pentane. The pentane solution was washed with water, saturated NaHCO₃ solution, water, dried over anhydrous Na₂SO₄, filtered and the pentane evaporated to leave 55.5 grams (71% yield) of the desired ester.

B. Preparation of 4-t-butylazo-4-methoxyvaleryl chloride

The above ester was saponified with 50% NaOH at 90°C. The yield of the acid was 84%. The acid in turn was converted to the acid chloride in pentane as described in EXamples XX and XXIV in 68% crude yield.

EXAMPLE XXVIII

Preparation of 12-t-Butylazo-12-cyanostearoyl chloride

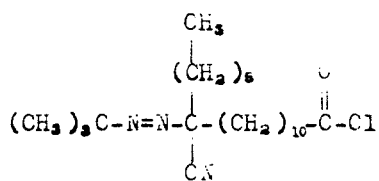

A. Preparation of the t-butylhydrazone of 12-ketostearic acid

A mixture of 45.2 grams (.066 moles) of a 12.8% aqueous solution of t-butylhydrazine, 18.0 grams (.06 moles) of 12-ketostearic acid and 10 mls. of benzene were heated in a 125 ml. flask equipped with a condenser was heated at 95°C for 2 hours. The reaction mixture was cooled, the organic layer separated, dried over anhydrous sodium sulfate, filtered and the benzene evaporated. The product weighed 21.0 grams (95.2% yield).

B. Preparation of 12-t-butylazo-12-cyanostearic acid

To a solution of 21.0 grams (.0568 moles) of the t-butylhydrazone of 12-ketostearic acid in 50 ml. of pentane, cooled to −20°C, was passed 2.02 grams (.0285 moles) of chlorine over a 10 minute period. The reaction was stirred an additional 15 minutes at −20°C, the white solid that formed, filtered off, and the pentane filtrate, which should contain approximately .0285 moles of the chloro compound added to a solution of 1.5 grams (.03 moles) of sodium cyanide in 20 mls. of 75% aqueous methanol. The reaction was stirred for 1 hour at 20°C, poured into 100 ml. of water, the pentane layer separated, washed with 5% HCl and then with water until neutral. The pentane solution was dried over anhydrous $Na_2SO_4$, filtered and the pentane evaporated to leave 8.5 grams (76% yield) of the desired acid.

C. Preparation of 12-t-butylazo-12-cyanostearoyl chloride

A mixture of 4.8 grams (.0122 moles) of 12-t-butylazo-12-cyanostearic acid, 2.6 grams (.0125 moles) of $PCl_5$ and 20 mls. of methylene chloride was stirred in a 50 ml. round bottom flask, equipped with a condenser and drying tube for ½ hour. At the end of this period infrared analysis on a small sample indicated that the acid chloride had completely formed. The methylene chloride solution was washed with ice cold water, cold saturated $NaHCO_3$ solution, dried over anhydrous $Na_2SO_4$, filtered and the methylene chloride evaporated to leave 3.95 grams (79% yield) of the desired acid chloride. The product was a light yellow liquid.

EXAMPLE XXIX

Preparation of 4-t-Butylazo-4-phenoxypentyl chloroformate

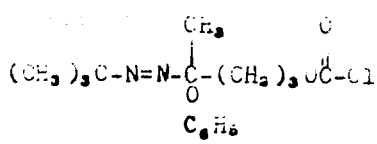

A. Preparation of the t-butylhydrazone of 3-acetylpropyl acetate

A mixture of 59.0 grams (0.41 moles) of 3-acetylpropyl acetate (prepared from acetyl chloride and 3-acetylpropanol) and 294 grams (0.5 moles) of a 15% aqueous solution of t-butylhydrazine in a 500 ml. erlenmeyer flask equipped with a condenser, was heated to 95°C for 2 hours and then allowed to cool to room temperature. The organic layer was separated, dried over anhydrous $Na_2SO_4$ and filtered. The product was a clear yellow liquid weighing 67.1 grams (76.5% yield).

B. Preparation of 4-t-Butylazo-4-chloropentyl acetate

Into a solution of 67.1 grams (0.313 moles) of the t-butylhydrazone prepared in step A in 300 mls. of pentane, cooled to −20°C in a 500 ml. round bottom flask equipped with a mechanical stirrer and thermometer, was passed 11.1 grams (0.16 moles) of chlorine over a 30 minute period. The reaction was stirred for an additional 15 minutes at −20°C and then filtered to remove the white solid which formed. The pentane filtrate was dried, filtered and the pentane evaporated to leave 29.3 grams (75.6% yield based on chlorine) of a clear yellow liquid. The product was stored in the dry ice chest overnight.

C. Preparation of 4-t-Butylazo-4-phenoxypentyl alcohol

To a solution of 1.72 grams (.026 moles) of 85% KOH in 20 mls. of methanol in a 100 ml. 3-necked round bottom flask equipped with a magnetic stirrer and thermometer was added 2.44 grams (.026 moles) of phenol. The reaction was stirred for 15 minutes at 15°C and then 6.25 grams (.025 moles) of the chloro compound prepared in step B was added dropwise over 20 minutes. The reaction was stirred an additional 30 minutes at room temperature. A sample was withdrawn and checked by infrared analysis which indicated the acetate was partially saponified to the alcohol. An additional 1.5 grams of KOH was added to the reaction mixture and the reaction stirred another 15 minutes. Infrared analysis indicated the saponification was complete so the reaction mixture was diluted with 200 mls. water and extracted with pentane. The pentane solution was washed with saturated $NaHCO_3$ solution, dried over anhydrous sodium sulfate, filtered and the pentane evaporated to leave 5.2 grams (80% yield) of the desired alcohol.

D. Preparation of 4-t-Butylazo-4-phenoxypentyl chloroformate

A solution of 2.5 grams (.025 moles) of phosgene in 30 ml. of pentane was placed in a 100 ml. 3-necked round bottom flask equipped with a reflux condenser, thermometer, dropping funnel and magnetic stirrer. The solution was cooled in an ice bath and a solution of 5.2 grams (.0197 moles) of 4-t-butylazo-4-phenoxypentyl alcohol and 2.0 grams (.025 moles) of pyridine in 10 ml. of pentane was placed in the dropping funnel. The pentane solution of the alcohol was added slowly over 15 minutes to the cooled phosgene solution. The reaction was stirred an additinal 15 minutes at 5°C and then 15 ml. of cold water added slowly to dissolve the pyridine hydrochloride that formed.

The pentane layer was separated, washed with 15 ml. of 1-2% HCl, washed with 15 ml. water, dried over anhydrous sodium sulfate, filtered and the pentane evaporated to leave 4.8 grams (75% yield) of a light yellow liquid. The infrared spectrum confimed that the alcohol was converted to the chloroformate.

EXAMPLE XXX

Preparation of 4-(p-t-butylthiophenoxy)pentyl chloroformate

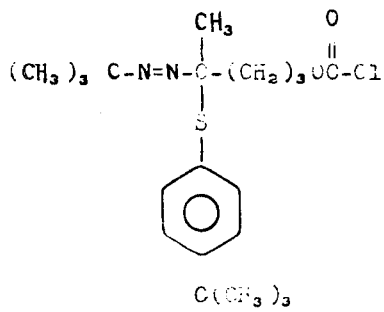

This compound was prepared in the same manner as the 4-phenoxy derivative described in Example XXIX except p-t-butylthiophenol was added instead of phenol to the methanolic solution of KOH before the chloro compound was added in step C. The acetate was saponified to the alcohol by the addition of excess base to the methanol after the reaction of the chloro compound and the p-t-butylthiophenol was complete. The alcohol was then converted to the chloroformate by adding a pentane solution of the alcohol and pyridine to a pentane solution of phosgene as in step D of Example XXIX. The infrared spectrum confirmed that the alcohol was converted to the chloroformate.

EXAMPLE XXXI

Preparation of 4-t-Butylazo-4-thiocyanopentyl chloroformate

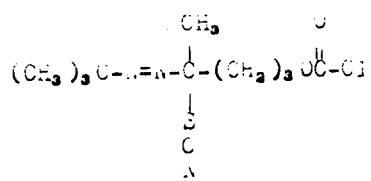

This compound was prepared in the same manner as the 4-phenoxy derivative described in Example XXIX except that the 4-t-butylazo-4-chloropentyl acetate was added to a slight molar excess of sodium thiocyanate in 70% aqueous isopropanol. The acetate was isolated and then saponified with methanolic KOH. The alcohol was then converted to the chloroformate by adding a pentane solution of the alcohol and pyridine to a pentane solution of phosgene as in step D of Example XXIX. The infrared spectrum confirmed that the alcohol was converted to the chloroformate.

EXAMPLE XXXII

Preparation of 4-t-Butylazo-4-methoxypentyl chloroformate

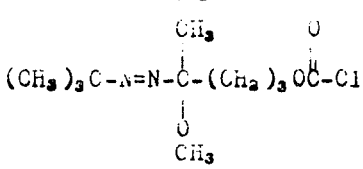

This compound was prepared in the same manner as the 4-phenoxy derivative described in Example XXIX except that phenol was not added to the methanolic solution of KOH before the 4-t-butylazo-4-chloropentyl acetate was added in step C. The acetate was saponified to the alcohol by addition of excess base to the methanol after the reaction of the chloro compound and the methoxide was complete. The alcohol was then converted to the chloroformate by adding a pentane solution of the alcohol and pyridine to a pentane solution of phosgene as in step D of Example XXIX. The infrared spectrum confirmed that the alcohol was converted to the chloroformate.

EXAMPLE XXXIII

Preparation of 4-t-Butylazo-4-octylthiopentyl chloroformate

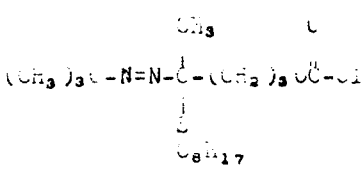

This compound was prepared in the same manner as the 4-p-t-butylthiophenoxy derivative described in Example XXX except 0b 1-octanethiol was added to the methanolic solution of KOH instead of p-t-butylthiophenol. The acetate was saponified to the alcohol and the alcohol converted to the chloroformate in the same manner as that used for the 4-p-t-butylthiophenoxy derivative.

EXAMPLE XXXIV

Preparation of 4-t-Butylazo-4-azidopentyl chloroformate

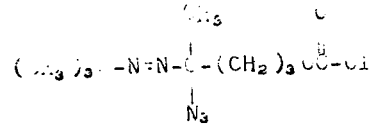

This compound was prepared in the same manner as the 4-thiocyano derivative described in Example XXXI except that the 4-t-butylazo-4-chloropentyl acetate was added to a slight molar excess of sodium azide in 70% aqueous methanol. The acetate was saponified by the addition of excess KOH to the reaction. The alcohol was then converted to the chloroformate by adding a pentane solution of the alcohol and pyridine to a pentane solution of phosgene. After workup the infrared spectrum confirmed that the alcohol was converted to the chloroformate.

EXAMPLE XXXV

Preparation of 4,4'-Azobis[4-(p-t-butylthiophenoxy)-pentyl chloroformate]

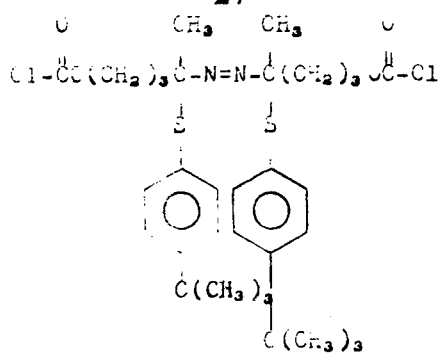

A. Preparation of the ketazine of 3-acetylpropanol

A mixture of 30 grams (0.3 moles), 7.3 grams of 66% hydrazine and 30 mls. of benzene in a 100 ml. round bottom flask equipped with a Dean Stark trap was heated in an oil bath at 90°C. until all the water azeotroped off. The reaction mixture was then cooled to room temperature and the benzene evaporated under reduced pressure.

B. Preparation of the ketazine of 3-acetylpropyl acetate

To a solution of 15 grams (.075 moles) of the above ketazine, and 12.6 grams (0.16 moles) of pyridine in 50 ml. of $CH_2Cl_2$ in a 250 ml. 3-neck round bottom flask equipped with a magnetic stirrer, thermometer and dropping funnel was added 11.7 grams (0.15 moles) of acetyl chloride dropwise over 30 minutes. The reaction temperature was controlled at 20°C with an ice bath. The reaction was stirred an additional 15 minutes, washed twice with 100 ml. portions of water, 100 ml. of saturated $NaHCO_3$, dried over anhydrous $Na_2SO_4$, filtered and the $CH_2Cl_2$ evaporated to leave 17.1 grams (80% yield) of a clear yellow liquid. The infrared spectrum confirmed that the alcohol was converted to the acetate.

C. Preparation of 4,4'-Azobis(4-chloropentyl acetate)

A solution of 17.1 grams (.0602 moles) of the ketazine prepared in step B in 75 ml. of $CH_2Cl_2$ in a 250 ml. 4-neck flask equipped with a mechanical stirrer, gas inlet tube and thermometer was cooled to −20°C by a dry ice bath. Into the solution was passed 4.3 grams (.0602 moles) of chlorine over a 15 minute period keeping the temperature at −20°C. After the addition was complete, the reaction was stirred an additional 15 minutes at −20°C and then slowly warmed to room temperature. The $CH_2Cl_2$ solution was dried over a mixture of $Na_2SO_4$ and $NaHCO_3$, filtered and the $CH_2Cl_2$ evaporated to leave 20.5 grams (96.3% yield) of a clear red liquid. The infrared spectrum was in agreement with the structure of the desired product.

D. Preparation of 4,4'-Azobis[4-(p-t-butylthiophenoxy)pentanol]

To a solution of 1.7 grams (.025 moles) of 85% of KOH in 40 ml. of methanol in a 100 ml. 3-neck round bottom flask equipped with a magnetic stirrer and thermometer was added 4.20 grams (.025 moles) of p-t-butylthiphenol and the reaction mixture stirred 15 minutes. To this solution was added dropwise 4.27 grams (.012 moles) of the dichloro azo compound prepared in step C, keeping the temperature below 10°C. After the addition was complete, the reaction was stirred an additional 15 minutes at room temperature. Then 1.5 grams of KOH were added to complete the saponification of the acetate ester. The reaction mixture was stirred an additional 30 minutes, diluted with 200 ml. of water and the product extracted with $CH_2Cl_2$. The $CH_2Cl_2$ solution was separated, washed with water, saturated $NaHCO_3$ solution, dried over anhydrous $Na_2SO_4$, filtered and the $CH_2Cl_2$ evaporated to leave 6.0 grams (94% yield) of a reddish brown liquid. The infrared spectrum was in agreement with the structure of the desired compound.

E. Preparation of 4,4'-Azobis[4-(p-t-butylthiophenoxy)pentyl chloroformate]

A solution of 2.5 grams (.025 moles) of phosgene in 25 ml. of pentane was placed in a 100 ml. 3-neck round bottom flask equipped with a reflux condenser, thermometer dropping funnel and magnetic stirrer. The solution was cooled in an ice bath and a solution of 6.0 grams (.011 moles) of the alcohol prepared in step D and 2.0 grams (.025 moles) of pyridine in 10 ml. of pentane was placed in the dropping funnel. The pentane solution of the alcohol was added slowly over 15 minutes to the cooled phosgene solution. The reaction was stirred an additional 15 minutes at 5°C and then 15 ml. of cold water added slowly to dissolve the pyridine hydrochloride that formed. The pentane layer was separated, washed with 15 ml. of 2% HCl, 15 ml. of saturated $NaHCO_3$ solution, dried over anhydrous sodium sulfate, filtered and the pentane evaporated to leave 5.2 grams (72% yield) of a dark brown liquid. The infrared spectrum confirmed that the alcohol groups were converted to chloroformate groups.

EXAMPLE XXXVI

Preparation of 4,4'-Azobis(4-octythiopentyl chloroformate)

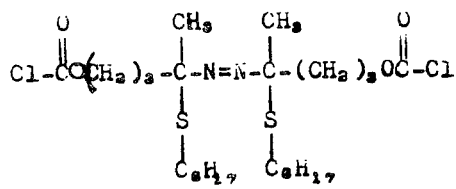

A. Preparation of 4,4'-Azobis(4-octylthiopentanol)

To a solution of 1.7 grams (.025 moles) of 85% KOH in 40 ml. of methanol in a 100 ml. 3-neck round bottom flask equipped with a magnetic stirrer and thermometer was added 3.65 grams (.025 moles) of 1-octanethiol and the reaction mixture stirred 15 minutes. To this solution was added dropwise 4.27 grams (.012 moles) of the dichloro azo compound prepared in step C of Example XXXV. The temperature was kept at 5°–10°C. during the addition. After the addition was complete, the reaction was stirred an additional 60 minutes at room temperature. Then one gram of KOH was added to complete the saponification of the acetate ester and the reaction mixture worked up the same as in step D of Example XXXV to give 5.9 grams (87% yield) of a clear red liquid. The infrared spectrum was in agreement with the structure of the desired compound.

B. Preparation of 4,4'-Azobis(4-octylthiopentyl chloroformate

A solution of 2.5 grams (.025 moles) of phosgene in 25 ml. of pentane was placed in a 100 ml. 3-necked round bottom flask equipped with a reflux condenser, thermometer, dropping funnel and magnetic stirrer. The solution was cooled in an ice bath and a solution of 5.1 grams (.0105 moles) of the alcohol prepared in step A and 2.0 grams (.025 moles) of pyridine in 10 ml. of pentane was added dropwise over 15 minutes. The reaction was stirred an additional 15 minutes at 5°C and worked up the same as in step E of Example XXXV to give 4.7 grams (76% yield) of a dark viscous liquid. The infrared spectrum confirmed that the alcohol groups were converted to chloroformate groups.

EXAMPLE XXXVII

Preparation of 4,4'-Azobis(4-azidopentyl chloroformate)

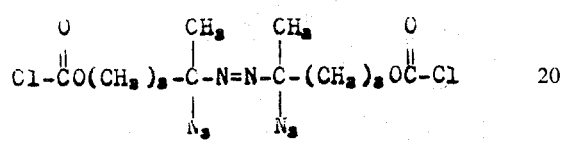

A. Preparation of 4,4'-Azobis(4-azidopentanol)

To a solution of 1.65 grams (.025 moles) of sodium azide in 40 mls. of 70% aqueous methanol cooled to 10°C. in an erlenmeyer flask was added dropwise 4.27 grams (.012 moles) of the dichloro azo compound prepared in step C of Example XXXV. After the addition was complete, the reaction was stirred an additional 30 minutes at room temperature. Then 1 gram of KOH was added to saponify the acetate ester and the reaction mixture stirred at 40°C for 30 minutes. The reaction mixture was then poured into 200 ml. of water and the product extracted with 50 ml. of $CH_2Cl_2$, the $CH_2Cl_2$ solution washed with saturated $NaHCO_3$ solution, dried over anhydrous $Na_2SO_4$, filtered and the $CH_2Cl_2$ evaporated to give 2.1 grams (50% yield) of a clear red liquid. The infrared spectrum was in agreement with the structure of the desired compound.

B. Preparation of 4,4' -Azobis(4-azidopentyl chloroformate)

A solution of 1.5 grams (.015 moles) of phosgene in 15 mls. of pentane was placed in a 100 ml. 3-neck flask equipped with a reflux condenser, thermometer, dropping funnel and magnetic stirrer. The solution was cooled in an ice bath and a solution of 2.1 grams (.007 moles) of the alcohol prepared in step A and 1.2 grams (.015 moles) of pyridine in 10 ml. of $CH_2Cl_2$ was added dropwise over 15 minutes. The reaction was stirred an additional 15 minutes at 5°C and worked up the same as in step E of Example XXXV to give 1.9 grams (65% yield) of a brown liquid. The infrared spectrum confirmed that the alcohol groups were converted to chloroformate groups.

Following the above-exemplified procedures, some additional novel compounds A of the subject invention which can be prepared include:

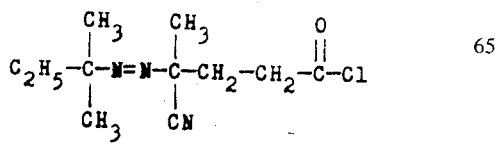

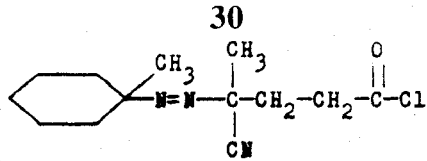

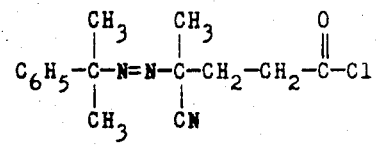

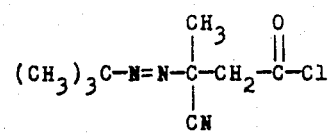

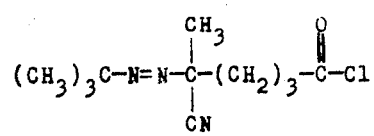

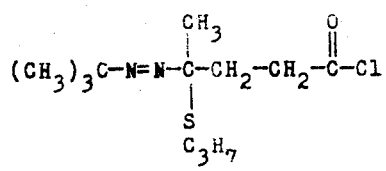

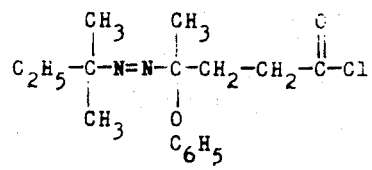

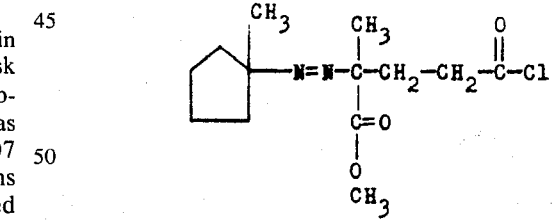

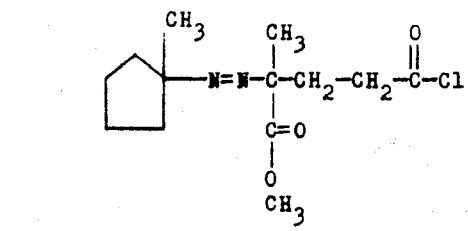

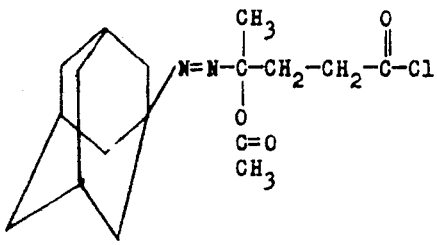

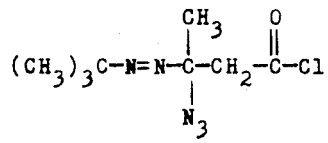

31
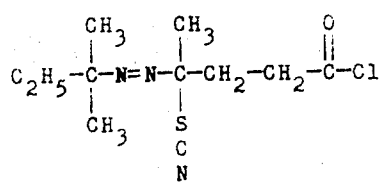
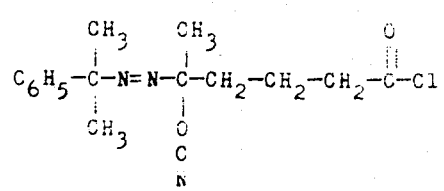
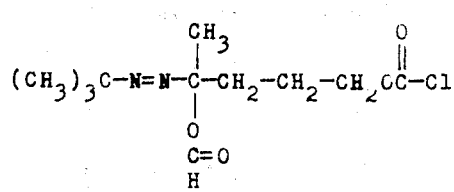
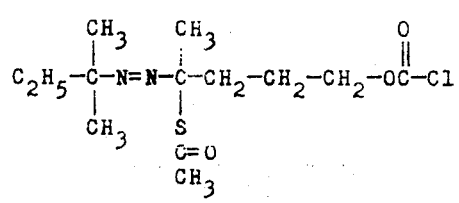
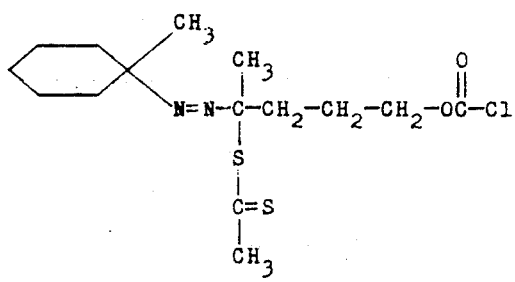
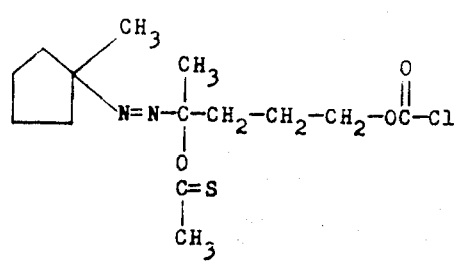
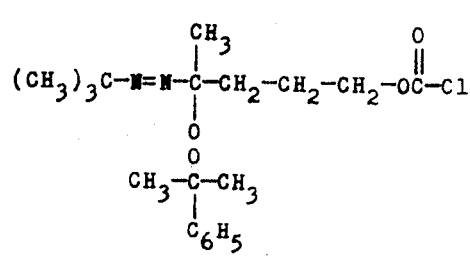
32
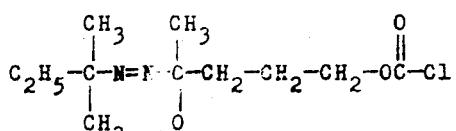
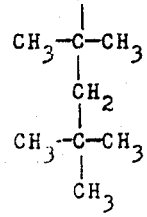
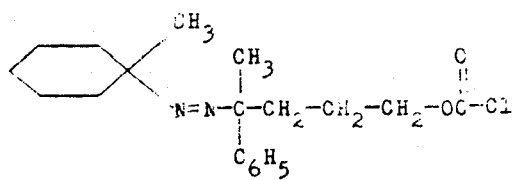
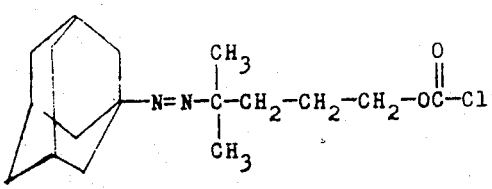
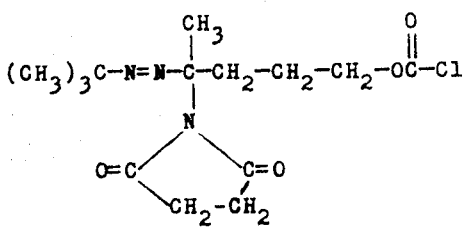
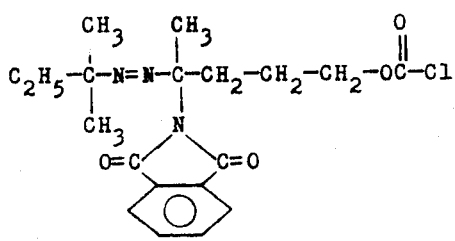
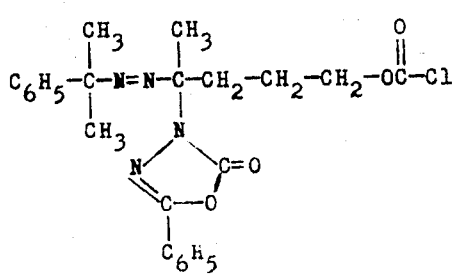

33
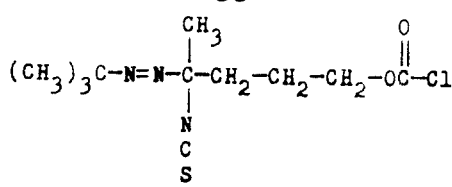
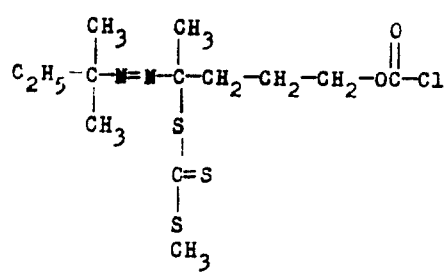
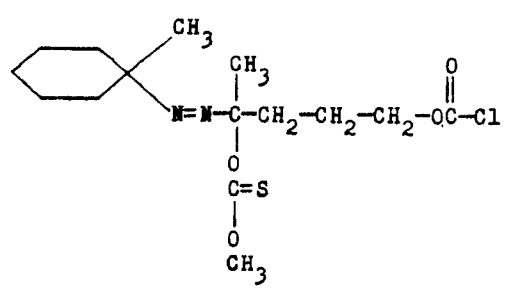
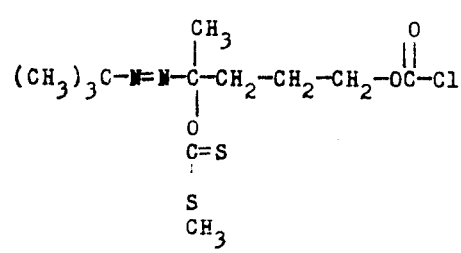
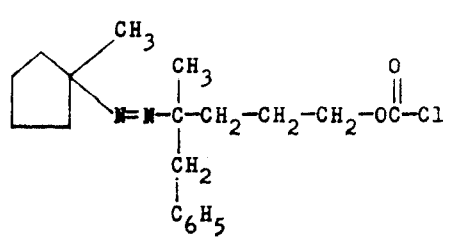
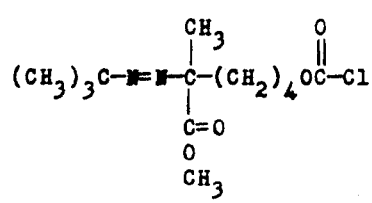
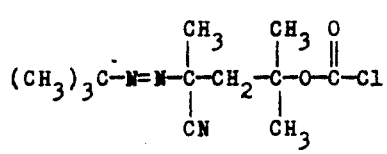
34
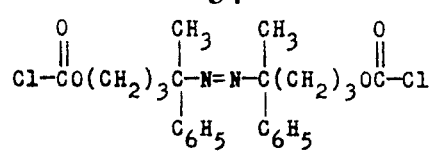
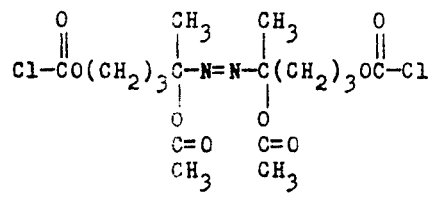
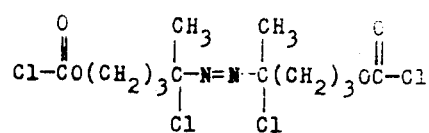
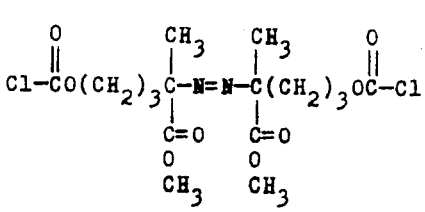
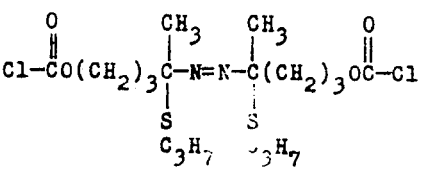
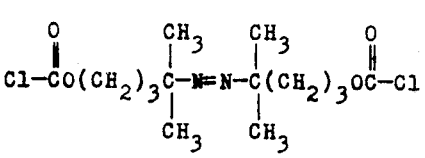
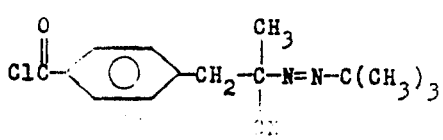
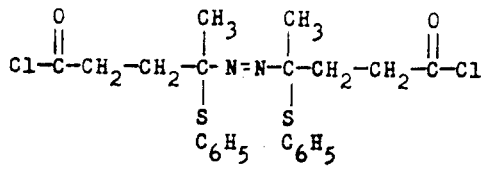

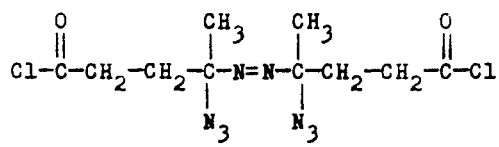
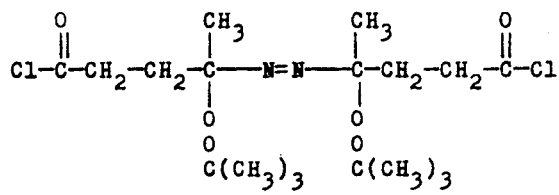
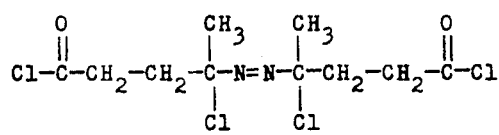
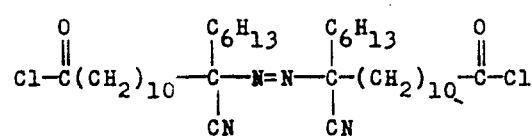
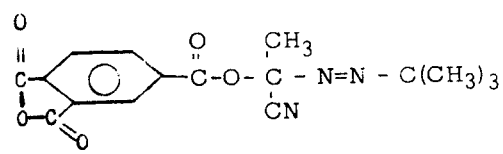
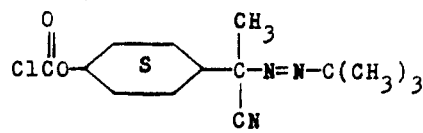
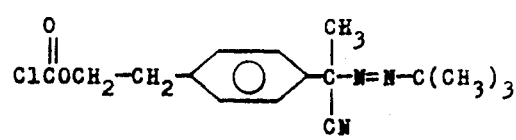
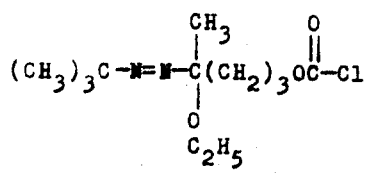
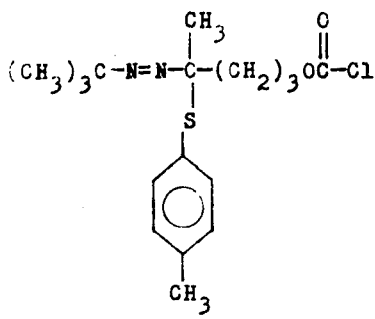
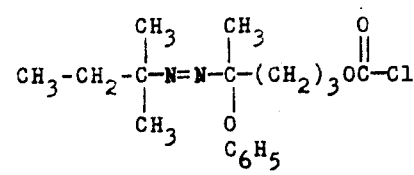
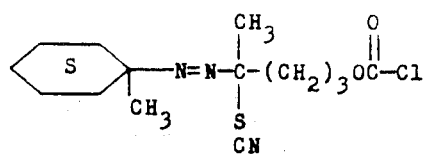
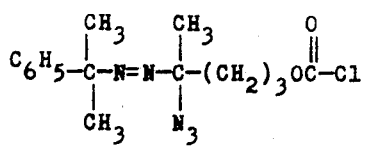
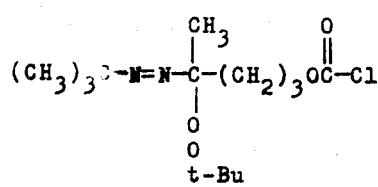
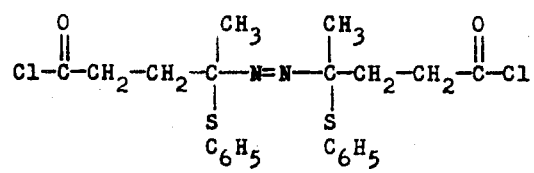
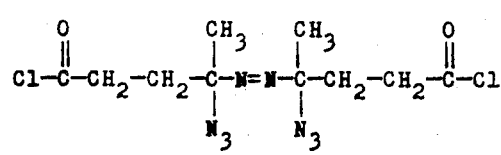
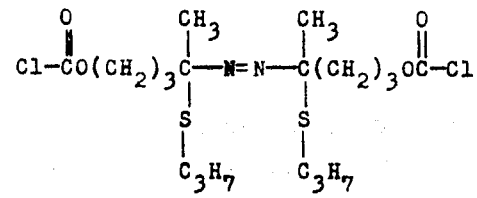

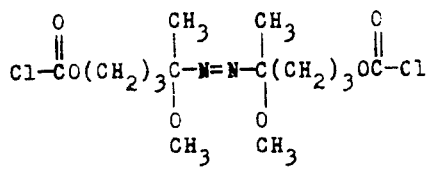

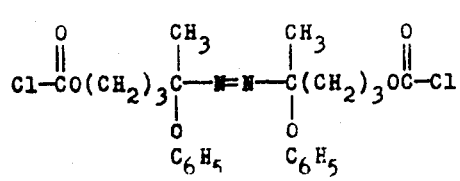

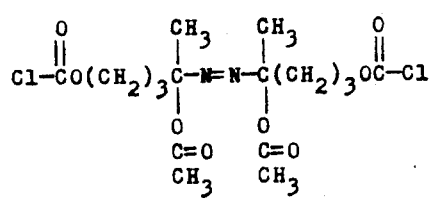

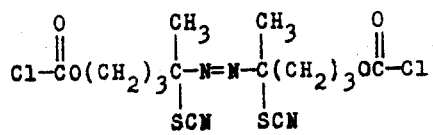

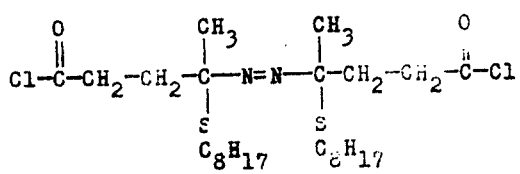

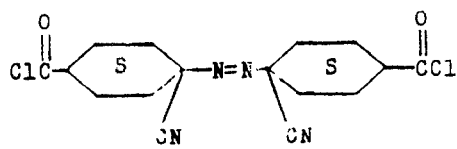

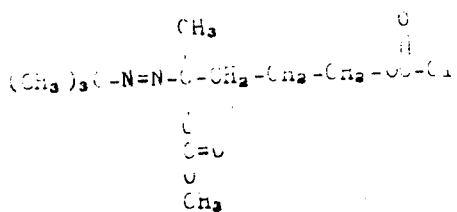

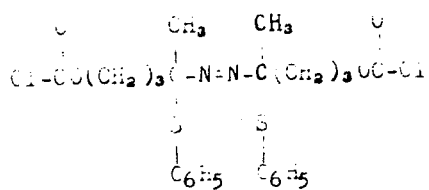

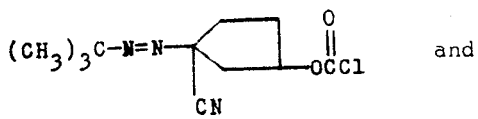 and

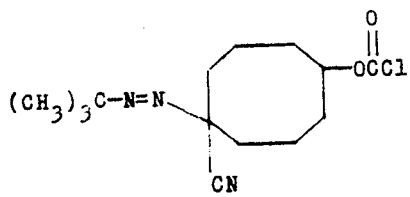

Numerous other Compounds A will become obvious to those skilled in the art.

We claim:

1. A polymer having the general formula:

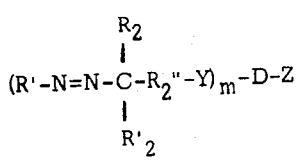

where:
a. R' is t-aliphatic having 4–10 carbon atoms;
b. m is an integer from 1 to 100;
c. Z is a radical selected from —OH, —NH$_2$, —NHR$_2$, —SH, —OR$_2$ and —H;
d. D is a residue having a valence of $m+1$ of polybutadiene;
e. Y is a divalent radical selected from —C(=O)O—, —OC(=O)O—, —C(=O)S—, —OC(=O)S—, —C(=O)NH—, —C(=O)N(R$_2$)—, —OC(=O)NH—, —OC(=O)N(R$_2$)—, —OC(=O)R$_3$(COOH)C(=O)O—, —OC(=O)R$_3$(COOH)C(=O)NH—, —OC(=O)R$_3$(COOH)C(=O)N(R$_2$)— and —OC(=O)R$_3$(COOH)C(=O)S—;
f. R$_2$ is lower alkyl;
g. R'$_2$ is —CN, —C(=O)OR$_6$, —OC(=O)R$_6$, —Cl, —Br, —OC(=O)H, —GC(=G)R$_5$, —GC(=G)GR$_5$, —GR$_5$, —N$_3$, —SCN, —NCS, —OCN, —OOR$_8$, —R$_5$,

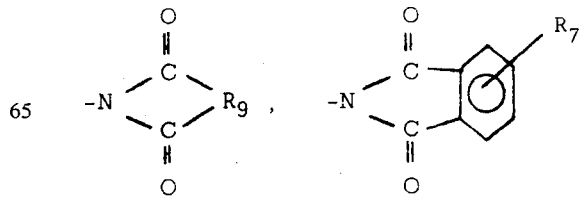

or

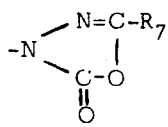 ;

h. $R_2''$ is an aliphatic, aromatic, aromatic-aliphatic or cycloaliphatic diradical;
i. $R_3$ is an aromatic, aliphatic or cycloaliphatic triradical;
j. G is oxygen or sulfur;
k. $R_5$ is an alkyl or cycloalkyl radical of 1–12 carbons or an aromatic radical of 6–12 carbons;
l. $R_6$ is lower alkyl;
m. $R_7$ is H, alkyl or cycloalkyl of 1–10 carbons, or aromatic of 6–12 carbons;
n. $R_8$ is tertiary aliphatic;
o. $R_9$ is lower alkylene; and
p. $R_2$ and $R_2''$, when taken together with the tertiary carbon atom connected to the azo nitrogen atom, form a cycloaliphatic triradical of 3–10 carbons.

2. A polymer having the general formula:

$$Z-(E-Y-R_2''-\underset{\underset{R'_2}{|}}{\overset{\overset{R_2}{|}}{C}}-N=N-\underset{\underset{R'_2}{|}}{\overset{\overset{R_2}{|}}{C}}-R_2''-Y)_m-E-Z$$

where:
a. E is a divalent residue of polybutadiene; and
b. $R_2$, $R'_2$, $R_2''$, m, Z and Y are as defined in claim 1.

3. The polymer

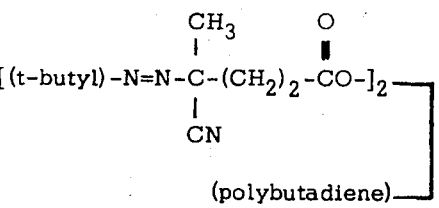

where the polybutadiene has an equivalent weight of 1330.

* * * * *